US008908128B2

(12) United States Patent
Takahashi et al.

(10) Patent No.: US 8,908,128 B2
(45) Date of Patent: Dec. 9, 2014

(54) COLOR FILTER SUBSTRATE AND LCD DEVICE USING IT

(75) Inventors: Sounosuke Takahashi, Kawasaki (JP); Yoshikazu Sakaguchi, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 383 days.

(21) Appl. No.: 12/208,356

(22) Filed: Sep. 11, 2008

(65) Prior Publication Data

US 2009/0073357 A1 Mar. 19, 2009

(30) Foreign Application Priority Data

Sep. 13, 2007 (JP) ................................. 2007-238378

(51) Int. Cl.
*G02F 1/1335* (2006.01)
*G02F 1/1333* (2006.01)
*G02F 1/1339* (2006.01)

(52) U.S. Cl.
CPC .... *G02F 1/133516* (2013.01); *G02F 1/133512* (2013.01); *G02F 1/133514* (2013.01); *G02F 2001/133357* (2013.01); *G02F 2001/133388* (2013.01)
USPC ............................ 349/106; 349/110; 349/153

(58) Field of Classification Search
CPC ..................... G02F 1/133512; G02F 1/133514
USPC ......................................... 349/106, 110, 154
See application file for complete search history.

(56) References Cited

U.S. PATENT DOCUMENTS

| 2005/0062907 | A1* | 3/2005 | Matsuoka et al. | 349/106 |
| 2005/0206829 | A1* | 9/2005 | Hashimoto et al. | 349/153 |
| 2006/0209233 | A1* | 9/2006 | Kawashima et al. | 349/106 |
| 2007/0242194 | A1* | 10/2007 | Jeoung et al. | 349/106 |

FOREIGN PATENT DOCUMENTS

| JP | 06-337308 | 12/1994 |
| JP | 09-211441 | 8/1997 |
| JP | 2003-161826 | 6/2003 |
| JP | 2005-265952 | 9/2005 |
| JP | 2007-72424 | 3/2007 |

OTHER PUBLICATIONS

Notice of Reasons for Rejection issued Feb. 7, 2012 by the Japanese Patent Office in corresponding Japanese Patent Application No. 2007-238378, with English translation, 6 pages.

* cited by examiner

*Primary Examiner* — Jessica M Merlin
(74) *Attorney, Agent, or Firm* — Young & Thompson

(57) ABSTRACT

In a color filter substrate without an overcoat layer, a planarization pattern layer is further provided so as to cover at least an outer step portion of a frame-shaped resin black matrix.

9 Claims, 11 Drawing Sheets

COLOR FILTER SUBSTRATE AND LCD DEVICE USING IT

INCORPORATION BY REFERENCE

This application is based upon and claims the benefit of priority from Japanese Patent Application No. 2007-238378, filed on Sep. 13, 2007, the disclosure of which is incorporated herein in its entirety by reference.

BACKGROUND OF THE INVENTION

1. Technical Field

The present invention relates to a color filter substrate and a liquid crystal display (LCD) device using it, and in particular, relates to the color filter substrate without an overcoat layer and the LCD device with it.

2. Background Art

In recent years, a flat panel display device such as the LCD device is widely used for its features of thinness, light-weight and low power consumption. Conventionally, such flat panel display devices have been mainly used as monitoring display for desktop computers and laptop computers. Now, the flat panel display devices are used for TV, and thus a more vibrant display is requested, that is, a display with the high color reproducibility is highly requested. In order to achieve a color display, many flat panel display devices are generally equipped with a color filter in which the color layer patterns are arranged so as to correspond to pixels. The above-mentioned color reproducibility is improved by adjusting optical spectrum of a light source of the flat panel display device and the optical spectrum of the color filter. In the LCD device, spectral adjustment for a light source such as three wavelength type cold cathode fluorescent lamp (CCFL) backlight and a light emitting diode (LED) backlight are performed and the spectral adjustment for the color layer of the color filter substrate used for a LCD panel is performed.

As for production of the color filter substrate, in general, a printing process, a photoresist method or an etching method is used. Among those methods, however, when considering a high-resolution controllability of the spectral properties and reproducibility, the photoresist method is most desirable. The photoresist method is a method to make a color filter by repeating color forming steps, which forms each color layer by performing pattern exposure and development, after coating a film of a coloring composition on the transparent substrate. The coloring composition is made by dispersing a pigment into a transparent resin together with a suitable soluble agent with photoinitiator and the polymerization monomer. The color filter is checked for a quality assessment by checking a film thickness unevenness at the time of coating, an irregular color due to aggregation of the color resist and pattern defects.

Cost reduction for the flat panel is also attempted in the TV use. Therefore, in consideration of cost reduction of various members composing the flat panel, its fundamental structure is reconsidered. In the LCD device for example, by reconsidering the structure of the color filter substrate as disclosed in the patent document 1 (Japanese Patent Application Laid-Open No. 1994-337308), the number of process and the material cost are reduced. The patent document 2 (Japanese Patent Application Laid-Open No. 1997-211441) discloses a configuration using black resin material instead of conventional chromium metal as the material of the black matrix (hereinafter, referred to as a BM) layer.

Here, a conventional structure of the color filter substrate and manufacturing method will be described with reference to drawings. FIG. 15 shows an example of a general color filter substrate coated with an overcoat layer (hereinafter, referred to as an overcoated color filter substrate). Each of FIG. 16 and FIG. 17 shows a cross sectional view along I-I line and II-II line of FIG. 15, respectively. FIG. 18 shows an example of the color filter substrate without the overcoat layer (hereinafter, referred to as a non-overcoated color filter substrate) using the BM layer of a resin material. Each of FIG. 19 and FIG. 20 shows a cross sectional view along I-I line and II-II line of FIG. 18, respectively. FIG. 21 is a cross sectional view showing the color filter substrate disclosed in patent document 2.

A process of manufacturing the non-overcoated color filter substrate 11 using the resin BM layer shown in FIGS. 18 to 20 will be described. First, a resin BM resist is applied on a glass substrate 12, and then exposed, developed and baked, and a first BM pattern (a resin BM pattern 13 such as a mesh pattern or a lattice pattern for defining pixels) in the display area 150 and a second BM pattern (a resin BM frame 14) is formed so as to be located on a peripheral area of the display area. Next, a color resist is applied, exposed, developed and baked, and the color layer pattern (a red color layer 151, a green color layer 152 and a blue color layer 153) is formed. After that, the surface polishing is performed if needed, and an alignment film 17 is formed, and then columnar spacers are provided to form a cell gap so as to be filled with liquid crystal.

In case of the overcoated color filter substrate 11 using the resin BM layer shown in FIG. 15 through FIG. 17, such as the color filter substrate for IPS (In Plane Switching) modes, for example, additional processing is included as disclosed hereinafter. In a manufacturing method of the above-mentioned overcoated color filter substrate, after a color layer pattern formation process, an overcoat layer formation process is inevitable wherein an acrylic resin or an epoxy resin is coated on the BM pattern and the color layer pattern and baking process is performed.

And then alignment process is performed on both color filter substrate 11 and an opposed substrate such as a thin film transistor (TFT) substrate which is provided with switching elements of TFT or the like arranged by a matrix pattern. After that, a liquid crystal (LC) panel is formed by either a liquid crystal dropping method or a liquid crystal injection method. After that, a pair of polarizing plates is provided on the LCD panel. The above-mentioned columnar spacers would be replaced by spherical spacers to form the cell gap of the LC panel.

In the color filter substrate which achieved cost reduction by not using the overcoat layer, various display defects tends to occur because the flatness of the surface of substrate is insufficient. Specifically, although the overcoat layer includes the function to mainly prevent dissolution of impurities from the color layer to the liquid crystal and the function to reduce a step of the surface of the color filter substrate, when the overcoat layer is eliminated, defects related to flatness deterioration occur. For example, halftone display blur due to uneven rubbing process or a contrast decline owing to light leak during black display are tended to occur. When resin material is used as the BM layer, those litter produced from the alignment film are observed at a step portion of the resin BM layer, e.g., stripped portions of the alignment film and fixed waste of the alignment film at the time of rubbing the alignment film. Those litter moves in the display area during a vibration test, and generates a defect called "vibration spot" and deteriorates the display quality.

In order to make the surface of the substrate flat, a method of tapering the color layer pattern is also proposed. However, when the overcoat layer is not formed around the outer peripheral portion 144 of the resin BM frame 14, a steep step of the resin BM frame 14 will expose, because the color layer pattern is generally not provided on the resin BM frame 14 or the dummy pattern is arranged only on of several pixel lines. Although the partial projection with the redundant color layer pattern and the BM pattern in the display area can be made flat by the surface polishing of the color filter substrate, a steep step at the outer peripheral portion 114 of the resin BM frame 14 cannot be formed into a tapered slope. Therefore, as long as a conventional method such as tapering the color layer pattern section and a method to polish the surface of the color filter substrate is used, the planarization effect of the substrate surface is limited in the display area only. Accordingly, as to the vibration spot which occurs from the neighborhoods of the resin BM frame 14, the above-mentioned conventional method is not enough to provide an effective improvement.

In the above-mentioned patent document 2, in order to evade a problem caused by the steep step at the outer peripheral portion 144 of the resin BM frame 14, a step portion is tapered by laminating an indium tin oxide (ITO) film 21 on the surface thereof as shown in FIG. 21. However, for example, in case of the color filter substrate for the IPS mode, when the ITO film 21 is provided on the surface of the color filter substrate, a vertical electric field which disturbs a horizontal electric field for performing the IPS drive mode is generated between the color filter substrate and the TFT substrate. Therefore, the ITO film 21 with such conductivity cannot be used. In this structure, since the ITO film 21 is newly formed, the cost of the ITO material is added and thus, there is a problem that the cost reduction advantage of the non-overcoated color filter substrate disappears.

In the above-mentioned patent document 2, covering the BM pattern with the same material as an alignment film 17 is also proposed. However, when the material of the alignment film is used, it is necessary to increase the thickness of the alignment film to form the taper at the step portion, i.e., usual film thickness of tens of nanometers (nm) needs to be formed quite thick as several micrometers (μm). Accordingly, the material cost that is generally occupied in the LC panel with the alignment film of a high unit price per weight is increased further. Since the coating unevenness and residual image would influence a display quality, even if the overcoat layer is omitted, the advantage of the cost reduction disappears.

Without adding either a new process or material, a method to reduce the steep step of the resin BM layer is also proposed. For example, it is disclosed in a patent document 3 (Japanese Patent Application Laid-Open No. 2003-161826) to set the angle between the resin BM layer and a transparent substrate to be 20-55 degrees. A color filter substrate is disclosed where the angle between the resin BM layer and the colored layer is set to be 10-25 degrees. However, when the resin BM frame is tapered by selecting the material or controlling an adjustment condition, the BM pattern in the display area is also tapered simultaneously. Therefore, as shown in FIG. 10, when the resin BM layer 40 is tapered, an area 410 where the film thickness at both ends of the pattern of the BM layer 40 having width W1 becomes thin, and its linearity is degraded by the lack of optical density (OD) value and chipping at developing process. Because of this, to meet the recent demand for high-resolution display, the width of the resin BM layer is further reduced to W2 as shown in the right side of FIG. 10, and an area 420 where the film thickness occupies the large proportion of the resin BM layer, and a high-definition with the color layer pattern is difficult to achieve.

SUMMARY

An exemplary object of the invention is to provide a color filter substrate which can improve the display quality without using the overcoat layer.

A color filter substrate according to an exemplary aspect of the invention includes a black matrix pattern of a light shielding layer formed on a transparent substrate, wherein the black matrix pattern includes a first pattern located on a display area and a second pattern located on a periphery of the display area so as to form a frame pattern of the black matrix pattern. The color filter substrate further includes a color layer pattern of resin material formed on the transparent substrate, and a planarization pattern layer formed on the substrate so as to cover at least an outer step portion of the frame pattern, wherein at least one of the black matrix pattern and the color layer pattern is not covered with an overcoat layer.

BRIEF DESCRIPTION OF THE DRAWINGS

Exemplary features and advantages of the present invention will become apparent from the following detailed description when taken with the accompanying drawings in which.

EXEMPLARY EMBODIMENT

Figure 1:
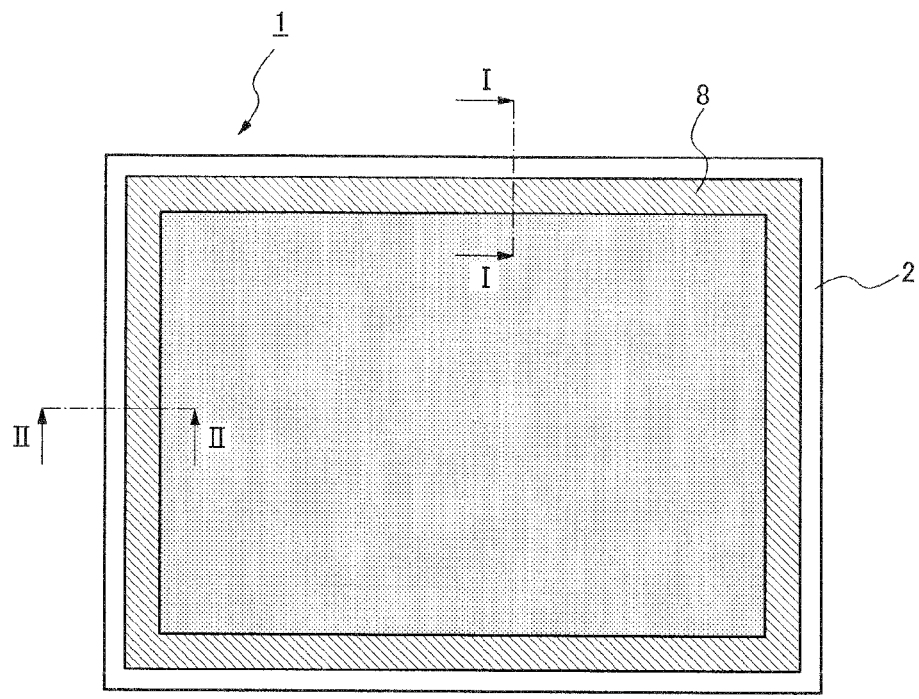
FIG. 1 is a plan view showing an exemplary configuration of a color filter substrate according to the first exemplary embodiment of the present invention.

Exemplary embodiments of the present invention will now be described in detail in accordance with the accompanying drawings.

Although the overcoat layer has been needed for the surface planarization, a conventional color filter substrate using resin BM layer can reduce reduction in production step of the color filter substrate and the overcoat layer material cost by eliminating the overcoat layer. However, in the color filter substrate without the overcoat layer, various display defects occur by a steep step on a surface of the color filter substrate.

As a method of leveling the surface of the color filter substrate, in order to reduce the steep step in the display area, there is a method to adjust the color resist material, and make the taper angle of the color layer pattern edge small. However, because the pattern of the color layer is not usually formed on the outer peripheral portion of the resin BM frame, this partial steep step cannot be reduced. Although a method to taper the resin BM frame is considered, when the resin BM frame is tapered, the BM pattern in the display area is also tapered simultaneously. Therefore, linearity of the BM pattern is deteriorated and thinning the BM pattern becomes difficult, and a high-definition color filter substrate cannot be achieved any more.

In particular, for example, in the color filter substrate for the IPS modes, the cell gap uniformity is important as the display quality compared with other LCD panel of an OCB (Optically Compensated Bend) mode, a TN (Twisted Nematic) mode and a VA (Vertical Alignment) mode, and it has been difficult to reduce the overcoat layer of a transparent resin which is the purpose of leveling the unevenness of the surface of the color filter substrate.

Accordingly, in the present invention, in the non-overcoated color filter substrate, in order to make planarization of the surface of the color filter substrate and a case that the steep step at the outer peripheral portion of the resin BM frame is made gentle in particular compatible with a high-definition of the resin BM layer, the planarization pattern layer is arranged so that it may be covered with the material other than the resin BM layer formed on the color filter substrate, for example, a color layer, pillar spacer material and a transparent resin which is used in order to indicate white display, around the resin BM frame. As a result, the surface of the color filter substrate can be leveled to the degree that does not influence a display quality without adding a new process and the new material in the color filter substrate for the IPS mode, for example.

As an example of various display defects which occur by the steep step of the surface of the color filter substrate without the overcoat layer, an indication defect caused by a rubbing process defect is mentioned. When the steep step exists in the surface of the color filter substrate in case of a rubbing alignment process, an area where hair ends of rubbing cloth do not sufficiently touch the surface of the color filter substrate occurs and causes disorder of the liquid crystal molecular alignment state. Uniformity of the alignment treatment by the rubbing process improves by leveling the surface of the non-overcoated color filter substrate by the above-mentioned planarization pattern layer, and a light leak during a black display owing to rubbing process and unevenness display in middle tones are reduced, and the display quality of the contrast and the display uniformity can be improved.

In the non-overcoated color filter substrate, a fixed litter of either stripped portions of the alignment film or caused by rubbing process for it is observed at the steep step portion at outermost periphery of the resin BM frame. Those fixed litter are difficult to remove in a cleaning step after the color filter substrate rubbing, and when those litter is detached in the vibration test for the LC panel, which floats and moves in the display area in the liquid crystal and generate "vibration spot defect". Because the outside step of the resin BM frame becomes gentle and becomes difficult for those litters to fix by leveling the surface of the non-overcoated color filter substrate by the above-mentioned planarization pattern layer, vibration spot occurrence can be reduced.

Figure 10:
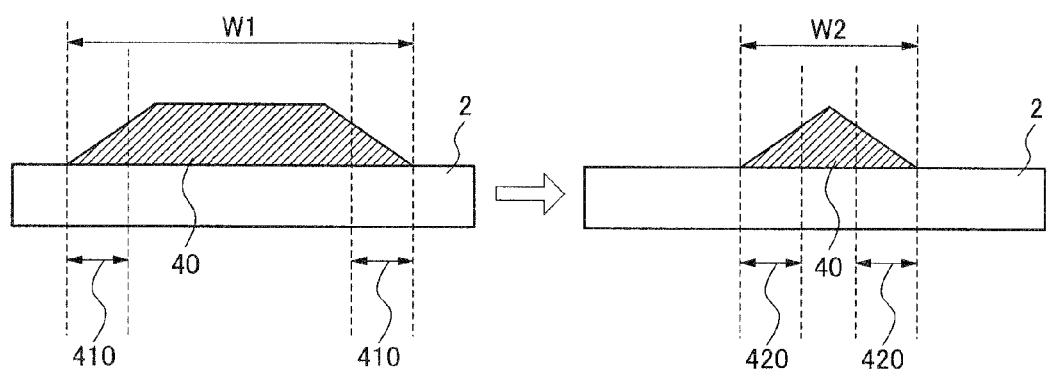
FIG. 10 is a schematic diagram showing a problem when a black matrix (BM) line width is decreased.

Although it is also possible to taper the resin BM pattern without providing the planarization pattern layer, it is inevitable to deteriorate linearity and fine patterning is difficult to attain, because the resin BM pattern in the display area is also tapered simultaneously as mentioned above. Since the side edges of the BM line become thin, it becomes easy to break off during developing process, and the required OD value is not obtained. The narrower the BM line width is, the more remarkable the problem becomes as shown in FIG. 10. By tapering an outermost periphery step portion of the resin BM frame by using the planarization pattern layer, the resin BM itself does not need to be tapered, and thus satisfy both of reduced steep step of the resin BM frame and a high-definition of the resin BM pattern.

During the formation of the above-mentioned planarization pattern layer, a relation between the taper angle of the BM layer and the taper angle of the planarization pattern layer is important, and thus the following consideration is performed. The consideration contents will be described with reference to FIG. 11 through FIG. 14.

Figure 11:
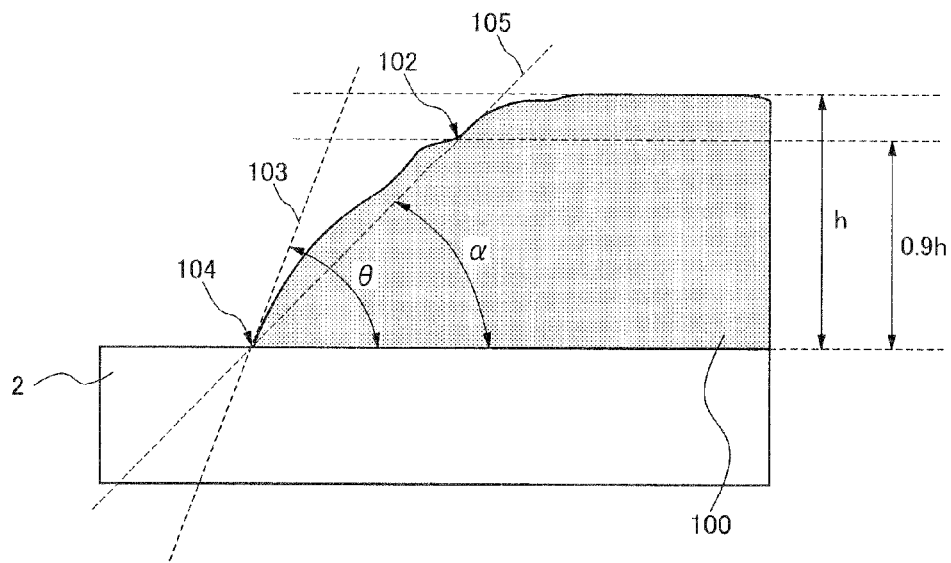
FIG. 11 is an explanation drawing showing a definition of a taper angle α and a tangential angle θ.
Figure 12:
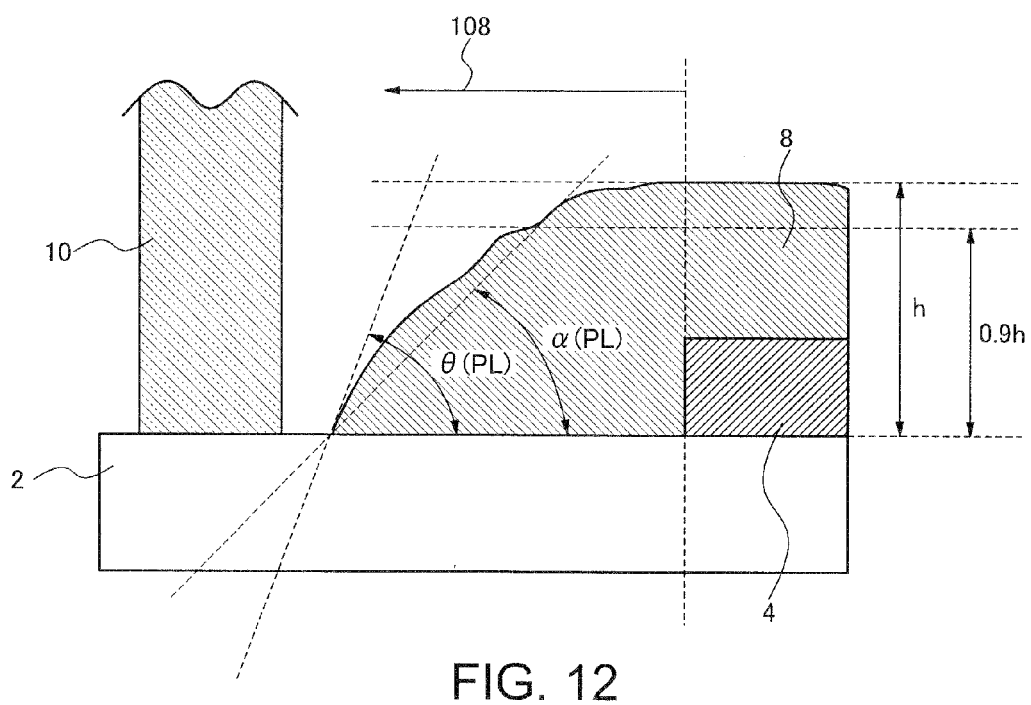
FIG. 12 is an explanation drawing showing a definition of a taper angle α(PL) and a tangential angle θ(PL) of the planarization pattern layer in a case on which the sealing pattern and the planarization pattern layer are not overlapped.
Figure 13:
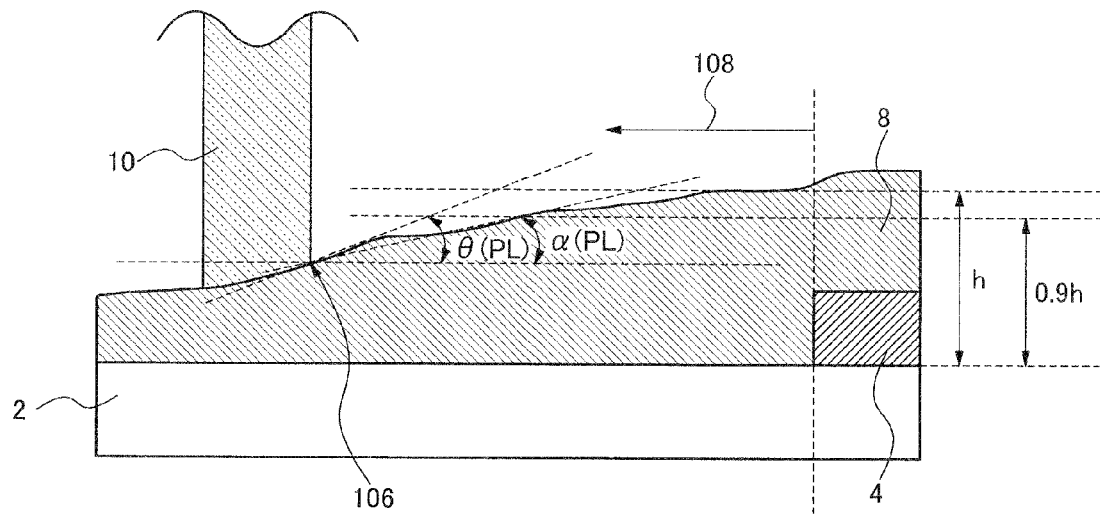
FIG. 13 is an explanation drawing showing a definition of the taper angle α(PL) and the tangential angle θ(PL) of the planarization pattern layer in a case on which the sealing pattern and the planarization pattern layer are overlapped.
Figure 14:
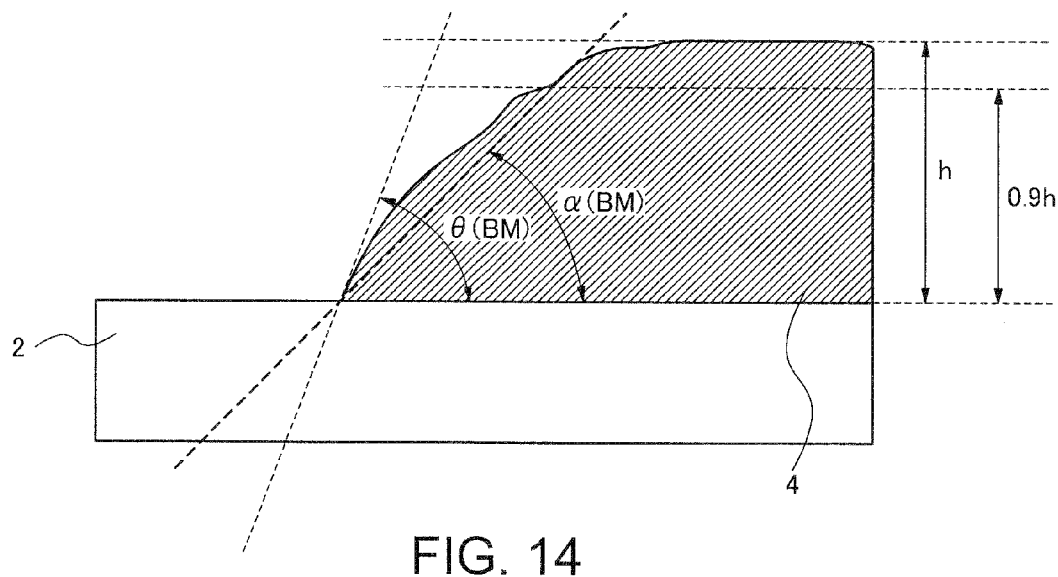
FIG. 14 is an explanation drawing showing a definition of a taper angle α(BM) of the resin BM layer and a tangential angle θ(BM) of the resin BM layer.
Figure 15:
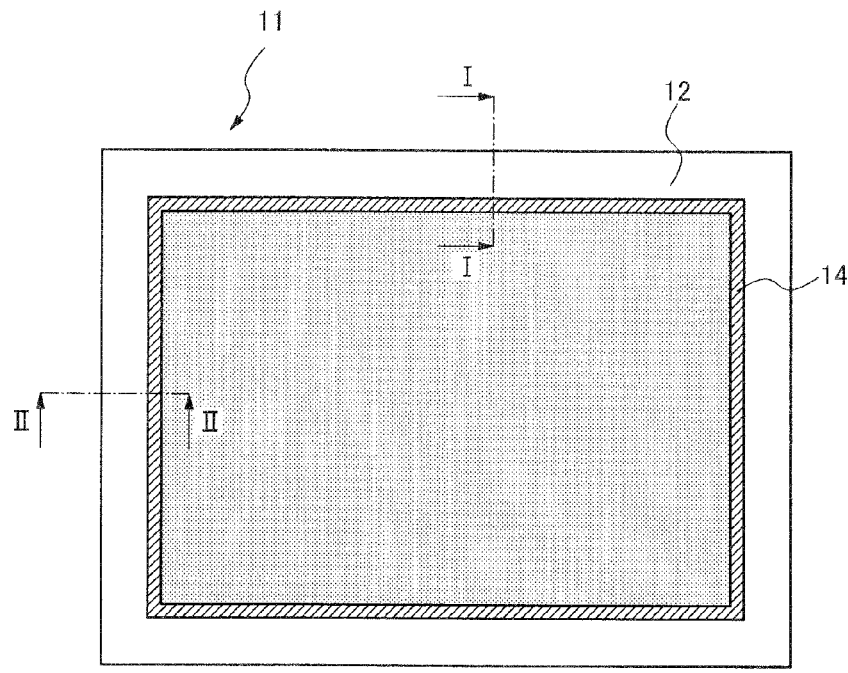
FIG. 15 is a plan view which indicates the structure of the conventional overcoated color filter substrate typically.
Figure 16:
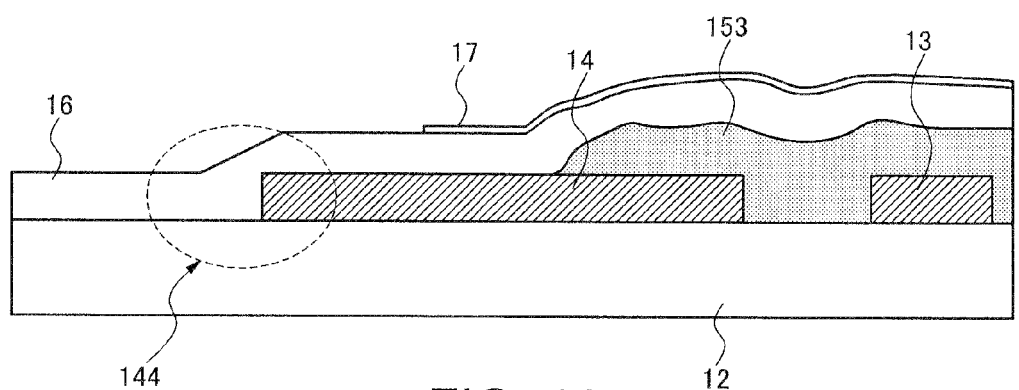
FIG. 16 is a cross sectional view which schematically indicates the structure of the conventional overcoated color filter substrate and indicates a part corresponding to a section along I-I line of FIG. 15.
Figure 17:
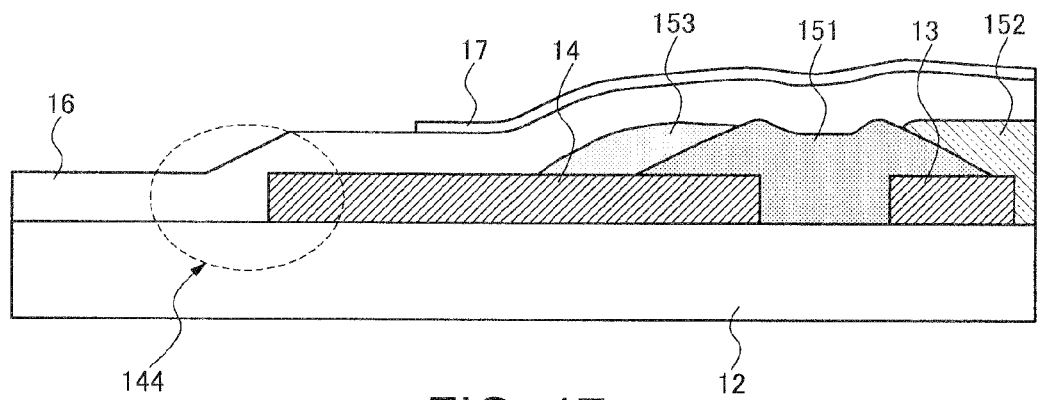
FIG. 17 is a cross sectional view which schematically indicates the structure of the conventional overcoated color filter substrate and indicates a part corresponding to a section along II-II line of FIG. 15.
Figure 18:
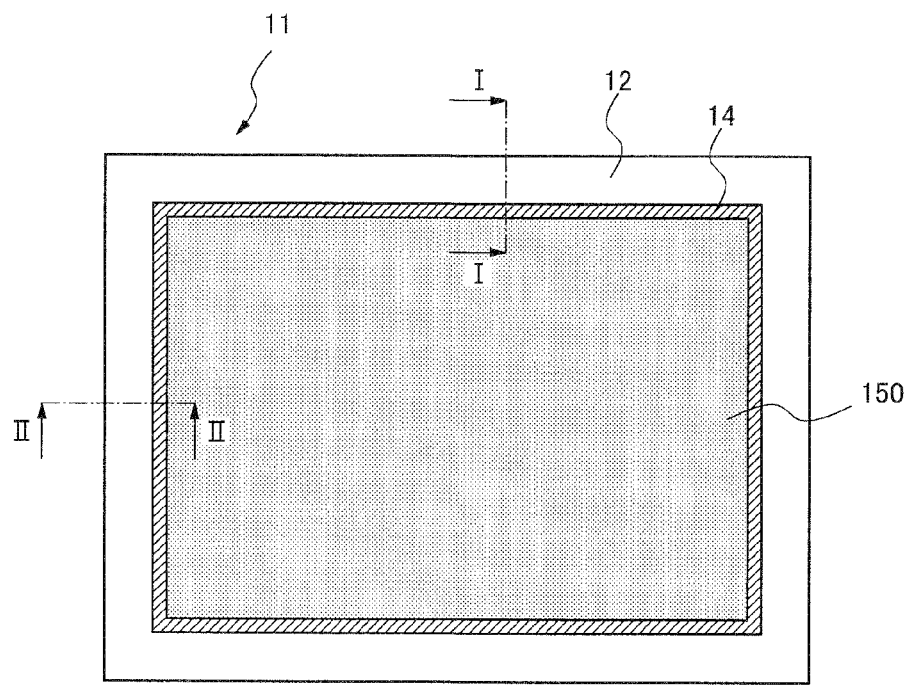
FIG. 18 is a plan view which schematically indicates the structure of the conventional non-overcoated color filter substrate.
Figure 19:
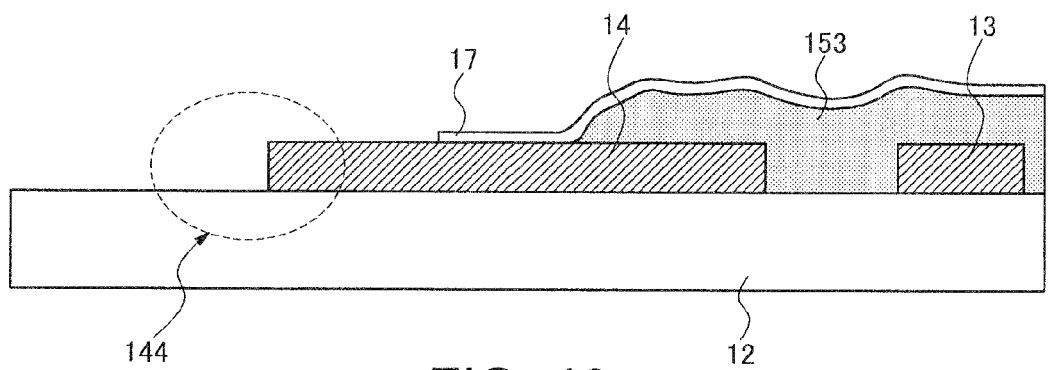
FIG. 19 is a cross sectional view which schematically indicates the structure of the conventional non-overcoated color filter substrate and indicates a part corresponding to a section along I-I line of FIG. 18.
Figure 20:
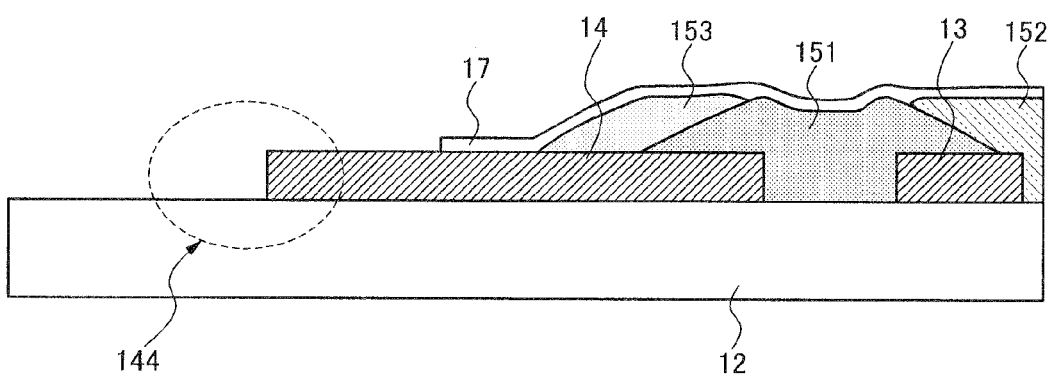
FIG. 20 is a cross sectional view which schematically indicates the structure of the conventional non-overcoated color filter substrate and indicates a part corresponding to a section along II-II line of FIG. 18.
Figure 21:
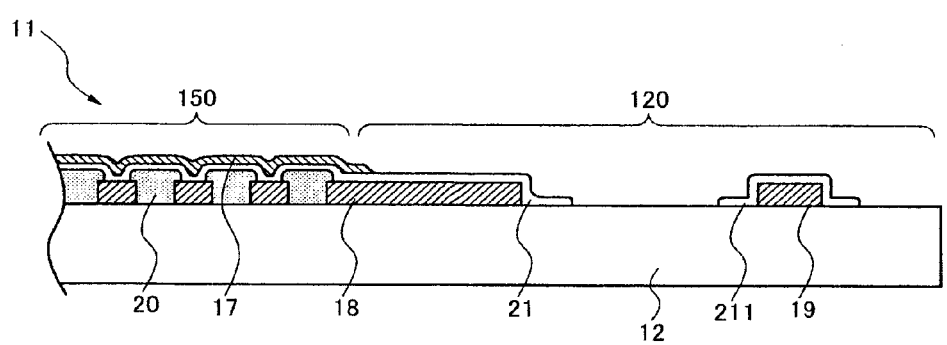
FIG. 21 is a cross sectional view which schematically indicates the structure of the conventional color filter substrate (patent document 2).

FIG. 11 is a drawing that defines an angle of a taper surface (hereinafter, referred to as the taper angle) of a resin layer 100 formed on a glass substrate 2, and also defines an angle of a tangential line 103 (hereinafter, referred to as the tangential angle). FIG. 12 is a drawing which defines the taper angle of a planarization pattern layer 8 and a tangential angle at a contact location of the glass substrate 2 and the planarization pattern layer 8 when the planarization pattern layer 8 is not overlapped with a sealing member 10. FIG. 13 is a drawing which defines the taper angle of the planarization pattern layer 8 at a contact location with the sealing member 10 and the tangential angle at a contact location 106 of the sealing member 10 the planarization pattern layer 8 is overlapped with the sealing member 10. FIG. 14 is a drawing which defines the taper angle of the resin BM frame 4 at a contact location with the glass substrate 2 and the tangential angle of the BM pattern (resin BM frame 4, for example). In these cases, the taper angle of the planarization pattern layer 8 is defined at an area which does not overlap with the resin BM frame portion.

As shown in FIG. 11, when the film thickness of the resin layer 100 is set to be h (h is defined as the film thickness of the resin layer located outside of the BM frame 4), the taper angle $\alpha$ is defined as an angle between two lines, one of which is a line parallel to a surface of a base member such as a glass substrate 2 and the other is a straight line between a contact location 104 of the resin layer with the base member at an outer edge thereof and a point 102 on a slope of the resin layer surface located at 90% of a film thickness (0.9 h) thereof (in FIG. 11, the taper angle $\alpha$ is formed between a dotted line 105 and the base member surface). On the other hand, a tangential angle $\theta$ of the resin layer 100 is an angle formed between the base member surface and the tangential line 103 at the contact point 104 of the outside edge of the resin layer 100 and base member 2.

First, respective taper angle $\alpha$ and tangential angle $\theta$ of the planarization pattern layer 8 and the resin BM frame 4 will be described about a case when the planarization pattern layer 8 is formed so as not to overlap with the sealing member 10, (referred to FIG. 12 and FIG. 14). Here, the taper angle of the planarization pattern layer 8 and the resin BM frame 4 is designated as $\alpha(PL)$ and $\alpha(BM)$ respectively, and the angle of the tangential line in a contact location with the respective glass substrates 2 is designated as $\theta(PL)$ and $\theta(BM)$, respectively. Since the reverse taper shape is undesirable for both the planarization pattern layer 8 and the resin BM frame 4, the above-mentioned angles are set to be not larger than 90 degrees. In FIG. 12, an arrow designated by a reference numeral 108 indicates that the film thickness h is measured from the end of the resin BM frame 4.

Each of contact angle or the tangential angle of the resin BM and the color layer is found by a tangential line method from a section scanning electron microscope (SEM) photographic observation. When the film thickness h of the resin BM is 1.25 µm, its taper angle $\alpha(BM)$ is 45.0 degrees and its tangential angle $\theta(BM)$ is 55.4 degrees. In a case that the color layer of blue (blue color layer 53) is used as the planarization pattern layer 8, and when the film thickness of the planarization pattern layer 8 (that is, blue color layer 53) is 2.0 µm, its taper angle $\alpha(PL)$ is 20.0 degrees and its tangential angle $\theta(PL)$ is 28.7 degrees. Preferable range of those angles can be considered by concerning followings. In the case of making those angles small, those angles depend on the respective material characteristics, because a negative type photosensitive resist is used for both of the resin BM layer and the color layers. On the other hand, in the case of making those angles large close to 90 degrees, those angles can be controlled by adjusting the condition of exposure and development thereof. More specific preferable range can be specified as follows.

[When the Sealing Pattern is Not Overlapped with the Planarization Pattern Layer]

Regarding the taper angles $\alpha(BM)$ and $\alpha(PL)$ of the resin BM frame and the planarization pattern layer, respectively, the taper angle $\alpha(BM)$ ranges from 45 degrees to 90 degrees, while the taper angle $\alpha(PL)$ ranges from 0 degree to no more 45 degrees, which can be described by following inequity:

$$45 \text{ degrees} \leq \alpha(BM) \leq 90 \text{ degrees; and}$$

$$0 \text{ degree} \leq \alpha(PL) \leq 45 \text{ degrees.}$$

Regarding the tangential angles $\theta(BM)$ and $\theta(PL)$ of the resin BM frame and the planarization pattern layer, respectively, the tangential angle $\theta(BM)$ ranges from 55 degrees to 90 degrees, while the tangential angle $\theta(PL)$ ranges from 28 degree to no more 55 degrees, which can be described by following inequity:

$$55 \text{ degrees} \leq \theta(BM) \leq 90 \text{ degrees; and}$$

$$28 \text{ degrees} \leq \theta(PL) \leq 55 \text{ degrees.}$$

When the sealing member 10 and the planarization pattern layer 8 are overlapped each other (refer to FIG. 13 and FIG. 14), based on a contact point 106 thereof, it is possible to define the taper angle $\alpha$ as formed between a parallel line of the principal surface of the glass substrate 2 and a tapered surface of the planarization pattern layer 8 in its cross section. The taper angle $\alpha$ can be specified in the followings. When the planarization pattern layer 8 is extended to an end face of the color filter substrate 1, the minimum value of the taper angle $\alpha$ is obtained.

[When the Sealing Pattern is Overlapped with the Planarization Pattern Layer]

Regarding the taper angles $\alpha(BM)$ and $\alpha(PL)$ of the resin BM frame and the planarization pattern layer, respectively, the $\alpha(BM)$ ranges from 45 degrees to 90 degrees, while the $\alpha(PL)$ ranges from 0 degree to no more 45 degrees, which can be described by following inequity:

$$45 \text{ degrees} \leq \alpha(BM) \leq 90 \text{ degrees; and}$$

$$0 \text{ degree} \leq \alpha(PL) \leq 45 \text{ degrees.}$$

As an example, the minimum value of the taper angle $\alpha$ when extending the planarization pattern layer 8 to an end face of the color filter substrate 1, although it depends on design distance between the sealing member 10 and the resin BM frame 4, is very small such as smaller than 1.0 degree, when the above-mentioned distance is 3-4 mm and the planarization pattern layer 8 around the resin BM frame 4 is made of the color layer, because the film thickness of resin BM is 1.3 µm and the film thickness of the color layer is 2.0 µm, and thus the film thickness of the overlapped part thereof is about 3.3 µm.

Various markers such as alignment marks are arranged on a peripheral area between the resin BM frame 4 and the edge of the glass substrate 2. In such a peripheral area of the color filter substrate 1, the planarization pattern layer 8 cannot be coated on the entire area in the peripheral area of the resin BM frame 4 to avoid an interference with those markers. In such a case, it is possible to reduce a defect of the vibration spot by arranging the planarization pattern layer 8 only limited area around the part of the resin BM frame 4 such that the planarization pattern film is formed only on the frame pattern by which angle $\beta$ between the rubbing direction of the alignment film and the direction crossing at right angles around the BM frame pattern so as to satisfy following inequity:

$$0 \text{ degree} \leq \beta \leq 45 \text{ degrees.}$$

However, the improvement effect of the invention declines compared with the case when the planarization pattern layer 8 is arranged on the entire peripheral area of the resin BM frame 4.

Hereinafter, more specific structure of the color filter substrates and the LCD device having the above-mentioned color filter substrates and a manufacturing method thereof will be described with reference to drawings.

Exemplary Embodiment 1

First, the color filter substrate and the LCD device according to the first exemplary embodiment of the present invention will be described with reference to FIG. 1 through FIG. 3. FIG. 1 is a plan view showing an exemplary configuration of the non-overcoated color filter substrate of this exemplary embodiment, and FIG. 2 and FIG. 3 are the cross sectional views.

Figure 2:
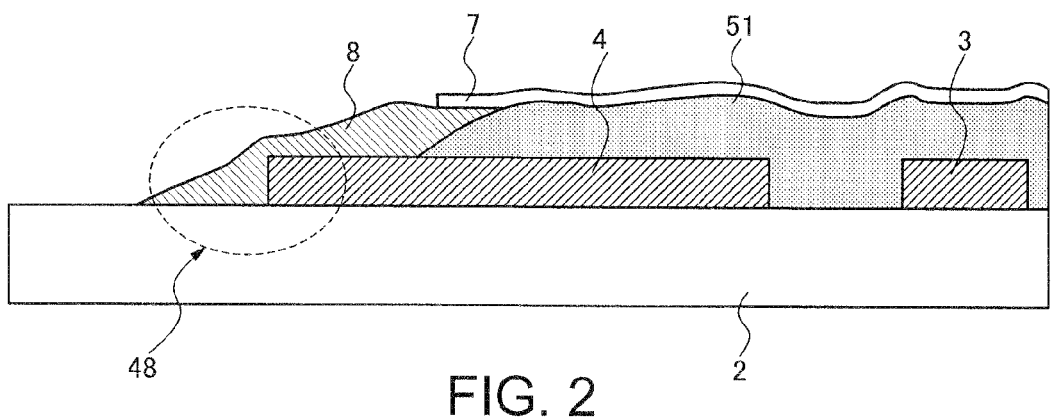
FIG. 2 is a cross sectional view along I-I line of FIG. 1.
Figure 3:
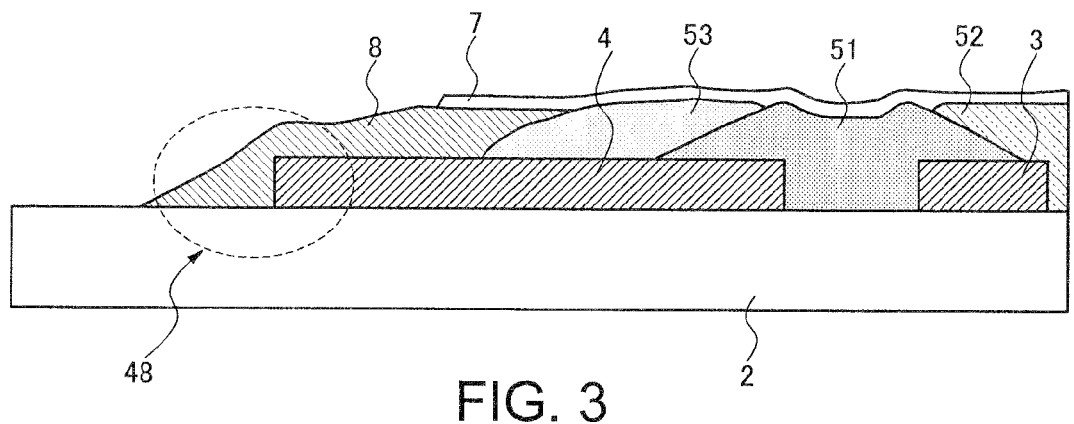
FIG. 3 is a cross sectional view along II-II line of FIG. 1.

As shown in FIG. 1 through FIG. 3, there are no transparent electrodes on the surface of the color filter substrate for the IPS modes and the color filter substrate 1 of this exemplary embodiment eliminating the overcoat layer to provide a non-overcoated structure. In such non-overcoated color filter substrate 1, the BM pattern is provided on the transparent substrate of glass substrate 2 or the like. For example, the resin BM resist is applied on the glass substrate 2, then exposed, developed, and baked to form the BM pattern which includes a resin BM pattern 3 located on the display area and the resin BM frame 4 located on a peripheral area of the display area. In general, the resin BM pattern 3 has a shape of a mesh pattern or a lattice pattern, but in the drawings, only a part of such pattern is shown.

The glass substrate 2 is further provided with the color layers of red, green and blue (a red color layer 51, green color layer 52 and blue color layer 53). Each color layer is formed such that each color resist is applied on the substrate, then exposed, developed, and baked to form each color layer for each pixel of color display. Moreover, the planarization pattern layer 8 is formed so as to cover an outer side step portion of the resin BM frame 4 and an alignment film 7 is formed at least on the display area.

In general, the color layer pattern is tended to be arranged as a dummy pixel around the resin BM frame 4. In this exemplary embodiment, however, the planarization pattern layer 8 is formed by using material other than the resin BM formed on the color filter substrate 1 in order to make an outer side step or its cross section of the resin BM frame 4 to be gentle, i.e., the taper angle is made small. As an example of its material, a color layer, pillar spacer material, and transparent resin used to display white can be used instead of a certain color layer in a half-transmissive reflective type LCD device. In this exemplary embodiment, it is characterized that the planarization pattern layer 8 is arranged so as to cover at least the resin BM pattern located at other than the display area. When there are the resin BM frame 4 and a dummy pixel, the planarization pattern layer 8 is arranged so as to cover both of them.

This planarization pattern layer 8 can be a single layer or it may be made a lamination structure by a plurality of materials. In this exemplary embodiment, tapering process is carried out by covering the step at the outer peripheral portion 48 of the resin BM frame 4 with a color layer (at least one of the red color layers 51, the green color layers 52 and the blue color layers 53). Therefore, in order to form the planarization pattern layer 8 simultaneously with color layer pattern in the display area, neither a new additional step nor the additional material are needed.

In order to make it a similar configuration as in the case of the overcoated structure, it is better to extend the planarization pattern layer 8 toward the edge portion of the color filter substrate 1. However, when the resin layer of the planarization pattern layer 8 is provided between the sealing member and the glass substrate, adhesion of the sealing member could lead to decline compared with the case of without the planarization pattern layer therebetween. Therefore, the planarization pattern layer 8 of this exemplary embodiment is formed so as not to reach the sealing pattern for sealing liquid crystal as shown in FIG. 12. An arrangement relation between the planarization pattern layer 8 and the sealing member 10 and a definition of the taper angle of the planarization pattern layer 8 is shown in FIG. 12.

As an example of the resin of BM layer used for the color filter substrate of the present invention, either the photosensitive material or the non-photosensitive material of the epoxy-based resin, the acrylic resin, the urethane-based resin, the polyester resin, the polyimide system resin and the polyolefine system resin can be used. In this exemplary embodiment, photosensitive acrylic resin is used. As an example of a light shielding material of the BM layer, various materials can be used such as carbon black, metal oxide such as titanium oxide and ferric tetroxide, metallic sulfide, and a metal. In addition, a mixture of red, blue and green pigments can be also used as the light shielding material of the BM layer. In view of light shielding function, it is preferable to use the carbon black.

As an example of the resin of the color layer, either the photosensitive material or the non-photosensitive material of the epoxy-based resin, the acrylic resin, the urethane-based resin, the polyester resin, the polyimide system resin and the polyolefine system resin can be used. In this exemplary embodiment, photosensitive acrylic resin is used. As an example of the organic pigment, an inorganic pigment and a dye or the like can be used as a pigment of the color layer.

As to the red pigment, anthraquinone origin pigment C. I. Pigment No. R-177, diketopyrrolopyrrole pigment C. I. Pigment No. R-254, quinacridone origin pigment C. I. Pigment No. R-207, and perylene origin pigment C. I. Pigment No. R-224 can be used mainly, and isoindolin pigment C. I. Pigment No. Y-139 or the like is employed as a complementary color pigment.

As to the green pigment, halogenated copper phthalocyanine pigment C. I. Pigment No. G-36, C. I. Pigment No. G-7 can be used mainly, and nickel azo complex pigment C. I. Pigment No. Y-150 and quinophthalone pigment C. I. Pigment No. Y-138 are employed as a complementary color pigment.

As to the blue pigment, phthalocyanine pigment C. I. Pigment No. B-15:6 can be used mainly, and dioxazine system pigment C. I. Pigment No. V-23 is employed as a complementary color pigment.

As an example of a dispersing agent, a surface-active agent or intermediate of pigment and dye can be used. An additive of a polymerization initiator and ultraviolet absorber is also added. In this exemplary embodiment, a negative-type resist is used for the color resist of red, green and blue.

On the color filter substrate, if needed, spacers are arranged to form the cell gap for the LC panel. In this exemplary embodiment, the spacers are located outside of the aperture portion and preferably fixed on the BM layer. That is, each of the spacers is arrange to support the liquid crystal cell gap on the BM layer and does not enter the aperture portion of the pixels. A columnar spacer is used more preferably. As an example of this spacer material, a negative-type resist with photosensitive acrylic resin is used.

Alignment process is performed on both color filter substrate 1 and the IPS type TFT substrate, and after that, the LC panel is formed by using either a liquid crystal dropping method or a liquid crystal injection method. After that, a pair of polarizing plates is provided on the LC panel and the LCD device can be made by connecting a driving circuit substrate to the LC panel combined with a backlight module.

In this way, the substrate surface can be leveled effectively without obstructing a high-definition of the BM pattern and the color layer pattern by arranging the planarization pattern layer 8 to cover at least outside step of the resin BM frame 4 by using the material except for the BM layer formed on the color filter substrate 1 without adding new step and extra time. Moreover, since the litter of the alignment film is not stuck at the step portion of the resin BM frame 4, the display quality can be improved.

Exemplary Embodiment 2

Next, the color filter substrate and the LCD device according to the second exemplary embodiment of the present invention will be described with reference to FIG. 4 and FIG. 5, which are cross sectional views showing an exemplary configuration of the color filter substrate of this exemplary embodiment.

Figure 4:
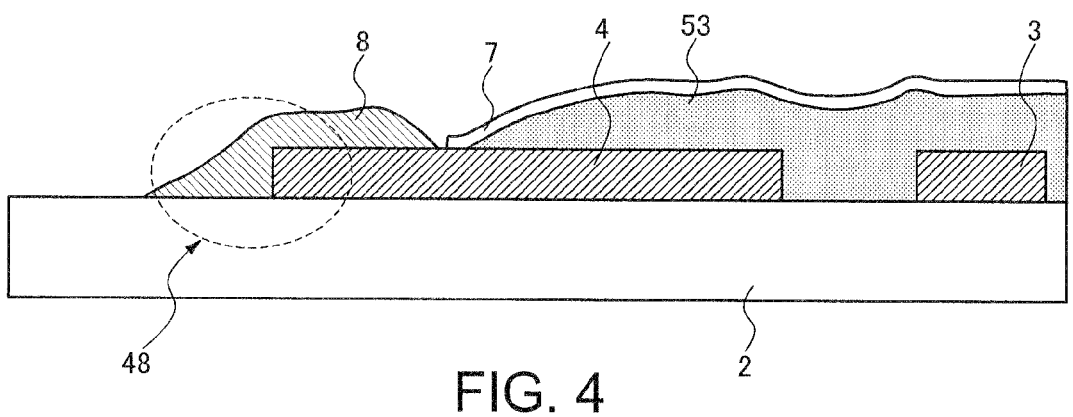
FIG. 4 is a cross sectional view showing an exemplary configuration of the non-overcoated color filter substrate according to the second exemplary embodiment of the present invention and indicates a part corresponding to a section along I-I line of FIG. 1.
Figure 5:
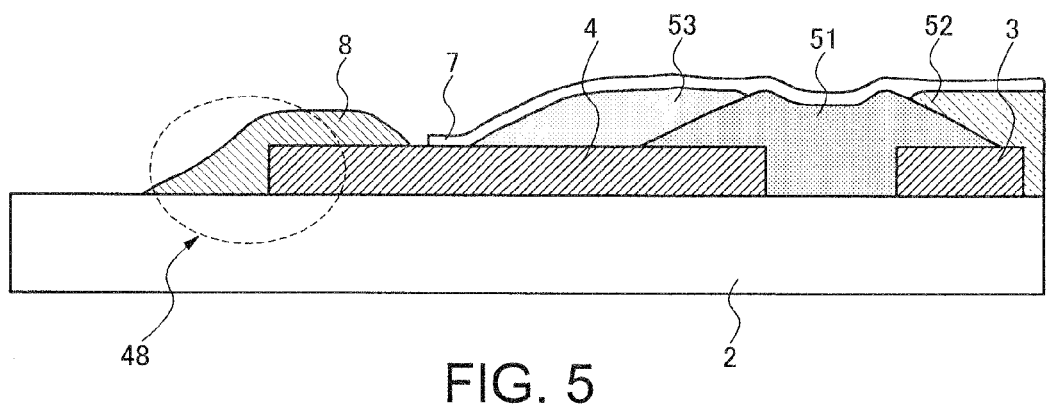
FIG. 5 is a cross sectional view showing an exemplary configuration of the non-overcoated color filter substrate according to the second exemplary embodiment of the present invention and indicates a part corresponding to a section along II-II line of FIG. 1.

As shown in FIG. 4 and FIG. 5, there are no transparent electrodes on the surface of the color filter substrate as in the case of used for the IPS modes and the color filter substrate 1 of this exemplary embodiment is the non-overcoated structure. One of differences with the first exemplary embodiment is that the planarization pattern layer 8 does not contact with the color layer (dummy pixel) on the resin BM frame 4. The other difference is that the alignment film 7 is not formed on the planarization pattern layer 8. In such a configuration, the decline of the display quality due to the step can be suppressed, this is because the outer-side step of the resin BM frame 4 is covered with the planarization pattern layer 8 which is formed of the material other than the BM layer formed on the color filter substrate 1.

The planarization pattern layer 8 may be made as a single layer structure with one of material other than the BM layer like the first exemplary embodiment, but a laminated layer structure with a plurality of materials is also available. It is preferable to arrange the planarization pattern layer 8 so as not reach the sealing pattern for sealing the liquid crystal as shown in FIG. 12 which shows an arrangement relation between the planarization pattern layer 8 and sealing member 10 in this exemplary embodiment and a definition of the taper angle $\alpha(PL)$.

Exemplary Embodiment 3

Next, the color filter substrate and the LCD device according to the third exemplary embodiment of the present invention will be described with reference to FIG. 6 and FIG. 7, which are cross sectional views showing an exemplary configuration of the color filter substrate of this exemplary embodiment.

Figure 6:
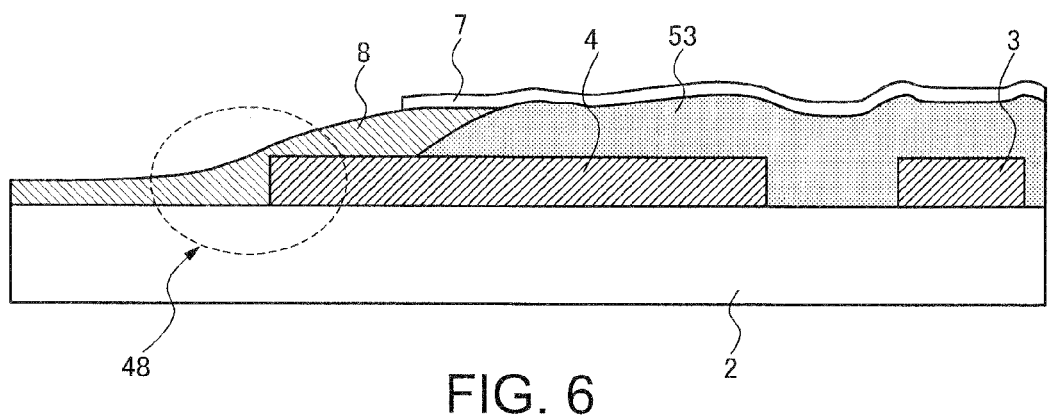
FIG. 6 is a cross sectional view showing an exemplary configuration of the non-overcoated color filter substrate according to the third exemplary embodiment of the present invention and indicates a part corresponding to a section along I-I line of FIG. 1.
Figure 7:
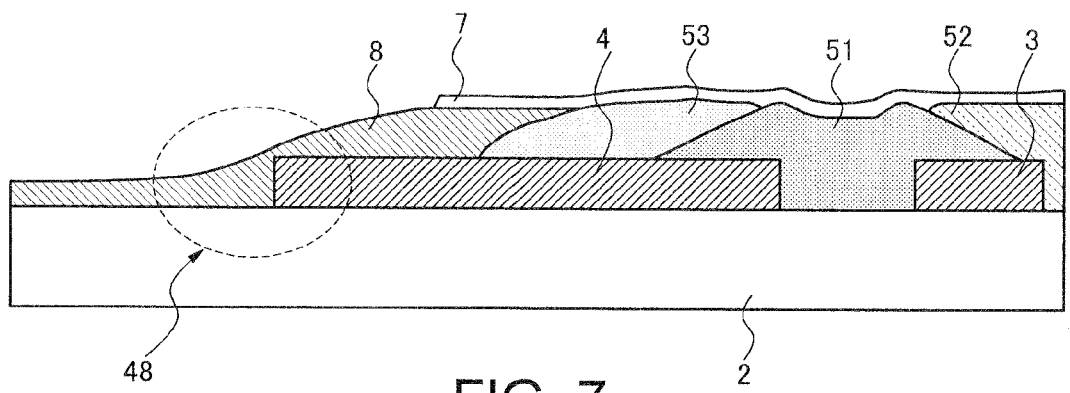
FIG. 7 is a cross sectional view showing an exemplary configuration of the non-overcoated color filter substrate according to the third exemplary embodiment of the present invention and indicates a part corresponding to a section along II-II line of FIG. 1.

As shown in FIG. 6 and FIG. 7, there are no transparent electrodes on the surface of the color filter substrate as in the case of used for the IPS modes and the color filter substrate 1 of this exemplary embodiment is the non-overcoated structure. Difference with the first exemplary embodiment is that the planarization pattern layer 8 is extended to the edge of the color filter substrate 1 from the resin BM frame 4. That is, in order to make it like the overcoated structure, the planarization pattern layer 8 is extended to an edge of the color filter substrate 1. In this structure, the sealing pattern is arranged on the planarization pattern layer 8. In such a configuration, the decline of the display quality due to the step can be suppressed, this is because the outer-side step of the resin BM frame 4 is covered with the planarization pattern layer 8 which is formed of the material other than the BM layer formed on the color filter substrate 1.

The planarization pattern layer 8 may be made as a single layer structure with one of materials other than the BM layer like the first exemplary embodiment, but a laminated layer structure with a plurality of materials is also available. The planarization pattern layer 8 can be formed so as to be located just beneath the sealing pattern for sealing liquid crystal as shown in FIG. 13 which shows an arrangement relation between the planarization pattern layer 8 and sealing member 10 in this exemplary embodiment and a definition of the taper angle $\alpha(PL)$.

Exemplary Embodiment 4

Next, the color filter substrate and the LCD device according to the fourth exemplary embodiment of the present invention will be described with reference to FIG. 8, which is a cross sectional view showing an exemplary configuration of the color filter substrate of this exemplary embodiment.

Figure 8:
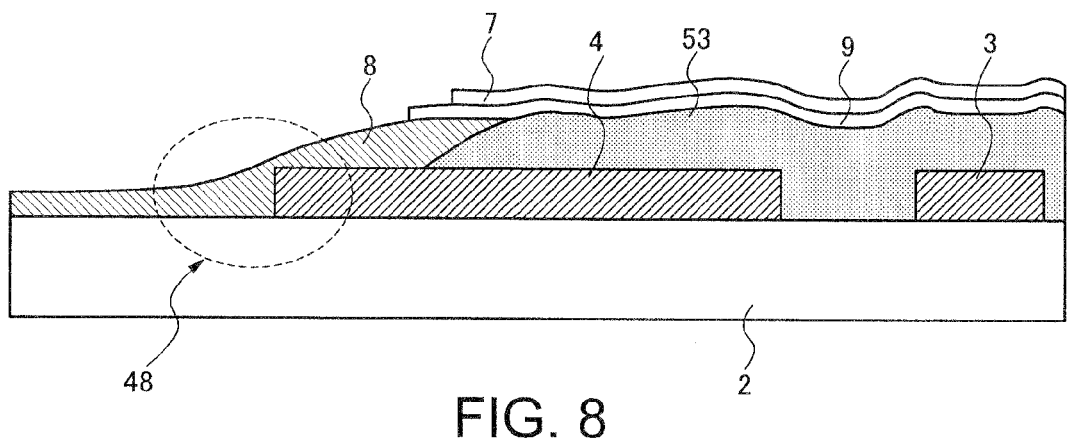
FIG. 8 is a cross sectional view showing an exemplary configuration of the non-overcoated color filters substrate according to the fourth exemplary embodiment of the present invention.

As shown in FIG. 8, there is a transparent electrode on the surface of the color filter substrate as in the case of used for a VA (Vertical Alignment) mode, a TN (Twisted Nematic) mode and an FFS (Fringe Field Switching) mode, and the color filter substrate 1 of this exemplary embodiment is the non-overcoated structure. In addition, a transparent electrode 9 of such as an ITO electrode is arranged between the color layer pattern and the alignment film 7. A material configuration and arrangement of the planarization pattern layer 8 are the same as those of the first to third exemplary embodiments. In such a configuration, a decline of the display quality due to the step can be suppressed, this is because the outer-side step of the resin BM frame 4 is covered with the planarization pattern layer 8 which is formed of the material other than the BM layer formed on the color filter substrate 1.

Exemplary Embodiment 5

Next, the color filter substrate and the LCD device according to the fifth exemplary embodiment of the present invention will be described with reference to FIG. 9, which is a plan view showing an exemplary configuration of the color filter substrate of this exemplary embodiment.

Figure 9:
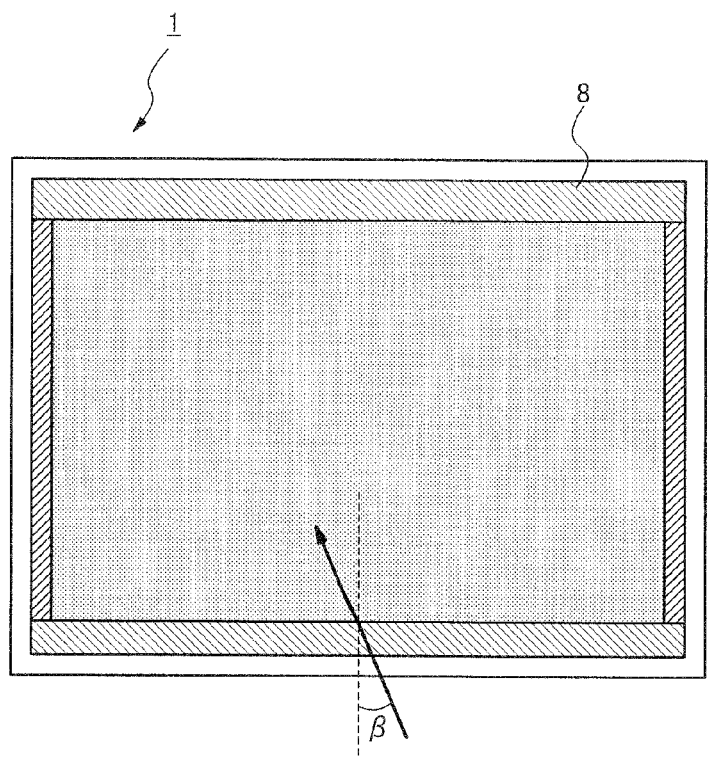
FIG. 9 is a plan view showing an exemplary configuration of the non-overcoated color filter substrate according to the fifth exemplary embodiment of the present invention.

As shown in FIG. 9, there are no transparent electrodes on the surface of the color filter substrate as in the case of used for the IPS modes and the color filter substrate 1 of this exemplary embodiment is the non-overcoated structure. Difference with the first to fourth exemplary embodiments is that the planarization pattern layer 8 is arranged only a part of the outer peripheral portion of the resin BM frame 4. For example, the planarization pattern layer 8 is arranged along a side area which satisfy such condition that an angle β formed between the rubbing direction of the alignment film as indicated by a thick arrow and the width direction of the resin BM frame is in a range of 0 degree≤β≤45 degrees.

When alignment marks formed by conventional resin BM layer are provided on the substrate, the planarization pattern layer 8 can be provided so as not overlap with the alignment marks. When the planarization pattern layer 8 is formed out of the color layer, the marker may be formed out of the color layer. A material configuration and arrangement of the planarization pattern layer 8 are the same as those of the first to fourth exemplary embodiments. In such a configuration, the decline of the display quality due to the step can be suppressed to some extent; this is because the outer-side step of the resin BM frame 4 is covered with the planarization pattern layer 8 which is formed of the material other than the BM layer formed on the color filter substrate 1.

In each above-mentioned exemplary embodiment, although the planarization pattern layer 8 is arranged so as to cover the step of the resin BM frame 4, the present invention is not limited to the above-mentioned exemplary embodiment, and it can be applied similarly to a case when an arbitrary step is formed on the color filter substrate. Although the color filter substrate of the present invention is applied to the LCD device, it can be applied to an arbitrary device using a color filter substrate which needs to be leveled.

As an example of utilization of the present invention, a color filter by which the multicolored pattern is arranged on the same surface is available for such color filters as the color filters for the LCD devices, the color filters for the flat display panels and the color filters for CCDs (Charge Coupled Devices) Besides the color filter for the LCD device, the present invention is available for other devices using the color filter such as a field emission-type display device, a fluorescent display device, a plasma display device and an image pickup device.

In the exemplary embodiment of the present invention, the planarization pattern layer can be made of a single layer made of either one of the resin material including a pigment for forming the color layer pattern of each color, resin material for forming the spacer and a transparent resin material for displaying white. The planarization pattern layer can be also made of a laminated film which laminates a plurality of materials selected from those materials mentioned above.

In the exemplary embodiment of the present invention, the planarization pattern layer can be formed on the same layer level of either one of the color layer pattern, the spacer and the white pattern at the same time.

In the exemplary embodiment of the present invention, the color layer pattern extends to a region located on the frame pattern of the black matrix, and the planarization pattern layer is arranged so as to contact with the color layer pattern on the frame pattern. Furthermore, an alignment film is provided so as to cover the part of the planarization pattern layer and the color layer pattern.

The color filter substrate according to the present invention, wherein the color layer pattern extends to a region located on the frame pattern of the black matrix, and the planarization pattern layer is formed on the frame pattern such that the planarization pattern layer is located outside of the color layer pattern. In this case, an alignment film is formed so as to cover the color layer pattern without overlapping with the planarization pattern layer. According to the present invention, a transparent electrode film can be formed beneath the alignment film.

In the exemplary embodiment of the present invention, a sealing member is further formed outside of the frame pattern of the black matrix, and the planarization pattern layer is formed so as not reach the sealing member, wherein a tangential angle $\theta(BM)$ of the black matrix pattern satisfies following inequity:

55 degrees≤$\theta(BM)$≤90 degrees;

a tangential angle $\theta(PL)$ of the planarization pattern layer satisfies following inequity:

28 degrees≤$\theta(PL)$≤55 degrees;

a taper angle $\alpha(BM)$ of the black matrix pattern satisfies following inequity:

45 degrees≤$\alpha(BM)$≤90 degrees; and a taper angle $\alpha(PL)$ of the planarization pattern layer satisfies following inequity:

0 degree≤$\alpha(PL)$≤45 degrees, wherein the tangential angle $\theta(BM)$ is defined as an angle of a tangential line of the black matrix pattern to the transparent substrate;

the tangential angle $\theta(PL)$ is defined as an angle of a tangential line of the planarization pattern layer to the transparent substrate;

the taper angle $\alpha(BM)$ is defined as an angle formed between two lines, one of which is a line parallel to the transparent substrate and the other is a straight line between a contact point of the frame pattern of the black matrix with the transparent substrate at an outer edge thereof and a point on a slope of the frame pattern located at 90% of a film thickness thereof; and the taper angle $\alpha(PL)$ is defined as an angle formed between two lines, one of which is a line parallel to the transparent substrate and the other is a straight line between a contact point of the planarization pattern layer with the transparent substrate at an outer edge thereof and a point on a slope of the planarization pattern layer located at 90% of a film thickness thereof.

In the exemplary embodiment of the present invention, a sealing member is further formed outside of the frame pattern, and the planarization pattern layer is formed so as to reach a region beneath the sealing member, wherein a taper angle $\alpha(BM)$ of the frame pattern of the black matrix satisfies following inequity:

45 degrees≤$\alpha(BM)$≤90 degrees;

while a taper angle $\alpha(PL)$ of the planarization pattern layer satisfies following inequity:

0 degree≤$\alpha(PL)$≤45 degrees, wherein the taper angle $\alpha(BM)$ is defined as an angle formed between two lines, one of which is a line parallel to the transparent substrate and the other is a straight line between a contact point of the black matrix pattern with the transparent substrate at an outer edge thereof and a point on a slope of the frame pattern located at 90% of a film thickness thereof, while the taper angle $\alpha(PL)$ is defined as an angle formed between two lines, one of which is a line parallel to the transparent substrate and the other is a straight line between a contact point of the planarization pattern layer with the transparent substrate at an outer edge thereof and a point on a slope of the planarization pattern layer located at 90% of a film thickness thereof.

In the exemplary embodiment of the present invention, the planarization pattern layer is formed by a selected member from those members formed on the transparent substrate except for the black matrix pattern such that the selected member tends to form gentle slope compared to the frame pattern of the black matrix.

In the exemplary embodiment of the present invention, a marker is formed by the black matrix pattern, and the planarization pattern layer is formed so as not to cover the marker.

In the exemplary embodiment of the present invention, the planarization pattern film is formed only on the frame pattern by which angle $\beta$ between a rubbing direction of an alignment film and the direction crossing at right angles around the frame pattern is designed to satisfy following inequity:

0 degree≤$\beta$≤45 degrees.

According to the present invention, a liquid crystal display device, a field emission-type display device, a fluorescent display device, a plasma display device and an image pickup apparatus are included to be equipped with the color filter substrate as described above.

The present invention includes a liquid crystal display device of a horizontal electric field drive system or IPS mode characterized by having the color filter substrate.

An exemplary advantage according to the invention is that the substrate surface can be leveled effectively without obstructing a high-definition of the BM pattern and the color layer pattern by arranging the planarization pattern layer to cover at least outside step of the resin BM frame by using the material except for BM formed on the color filter substrate without adding new step and extra time.

By leveling the substrate surface, those litter produced by the alignment film are not observed at a step portion of the resin BM, e.g., stripped portions of the alignment film and fixed waste of the alignment film at the time of rubbing the alignment film is not observed. Thus such defect called "vibration spot" caused by litter moved in the display area during a vibration test is not occur and does not deteriorates the display quality.

In the color filter substrate without the overcoat layer, by arranging the planarization pattern layer around the outer peripheral portion of the resin BM frame, the surface of the color filter substrate can be leveled to the degree that does not influence a display without adding a new process and the new material.

When a steep step exists on the surface of the color filter substrate at a rubbing process for the alignment film, an untouched area to a rubbing cloth is produced, i.e., hair ends of the rubbing cloth do not sufficiently touch the surface of the color filter substrate occurs, and thus causes disorder of the liquid crystal molecular alignment state. According to the present invention, however, uniformity of the alignment process by a rubbing treatment improves by leveling the surface of the color filter substrate without the overcoat layer by the above-mentioned planarization pattern layer, and light leakage in a black display owing to rubbing process and unevenness display in middle tones are reduced, and the display quality of the contrast and the display uniformity can be improved.

In the color filter substrate without the overcoat layer, a fixed litter of either stripped portions of the alignment film or caused by rubbing process for it is observed at a steep step portion in outermost periphery of the resin BM frame. Those fixed litter are difficult to remove in a cleaning step after the color filter substrate rubbing, and when those litter is detached in a vibration test for a panel, which floats and moves in the display area in the liquid crystal and generate "vibration spot defect". Because a step in the resin BM frame outermost periphery becomes gentle and becomes difficult for those litters to fix by leveling the surface of the color filter substrate without the overcoat layer by the above-mentioned planarization pattern layer, defect of "vibration spot" can be reduced.

By tapering an outermost periphery step portion of the resin BM frame by using the planarization pattern layer, the resin BM itself does not need to be tapered, and thus satisfy both of reduced steep step of the resin BM frame and a high-definition of the resin BM pattern.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A color filter substrate comprising:
   a black matrix pattern of a light shielding layer formed on a transparent substrate, said black matrix pattern including a first pattern located on a display area and a second pattern located on a periphery of said display area so as to form a frame pattern of said black matrix pattern;
   three color layer patterns of resin material formed on said transparent substrate, the three color layer patterns being of red, green, and blue respectively;
   a planarization pattern layer formed on said substrate so as to cover at least an outer step portion of said frame pattern;
   wherein said planarization pattern layer is one of i) a single layer made of a resin material including a pigment for forming said color layer pattern of each color or ii) a transparent resin material layer for displaying white,
   wherein said color layer patterns are arranged with a stripe formed against said black matrix pattern, and said color layer patterns are also arranged with a stripe formed on said frame pattern including outside of said display area as a dummy pixel, and
   wherein i) two of the three said color layer patterns on said frame pattern and said planarization pattern layer, or ii) one of the three said color layer patterns and said planarization pattern layer, are connected on said frame pattern to form connected patterns with a connected color layer pattern and a connected planarization pattern layer such that a cross section of a portion of the connected patterns has a structure where i) a first one of an edge of said connected color layer pattern and an edge of said connected planarization pattern layer has a forward tapered shape and ii) a second one of the edge of said connected color layer pattern and the edge of said connected planarization pattern layer has an inverse tapered shape, and said portions of said connected patterns are arranged parallel on said frame pattern along said planarization pattern layer.

2. The color filter substrate according to claim 1, wherein said black matrix pattern is a single layer film of resin material containing a light shielding material.

3. The color filter substrate according to claim 1, wherein said planarization pattern layer is one of a single layer and a laminated layer, said single layer is made of either one of resin material including a pigment for forming said color layer pattern of each color, resin material for forming the spacer and a transparent resin material for displaying white, and said laminated layer is made by laminating a plurality of materials selected from said resin material including said pigment for forming said color layer pattern of each color, said resin material for forming said spacer and said transparent resin material for displaying white.

4. The color filter substrate according to claim 3, wherein said planarization pattern layer is formed on a same layer level of either one of said color layer pattern, said spacer or said white pattern at a same time.

5. The color filter substrate according to claim 1, further comprising a transparent electrode film formed beneath said alignment film.

6. The color filter substrate according to claim 1, wherein said planarization pattern layer is formed by a selected member from those members formed on said transparent substrate except for said black matrix pattern such that a side surface of said selected member has a gentle slope compared to a side surface of said black matrix pattern.

7. The color filter substrate according to claim 1, wherein, a taper angle α(BM) of said frame pattern satisfies following inequity:

45 degrees≤α(BM)≤90 degrees;

while a taper angle α(PL) of said planarization pattern layer satisfies following inequity:

0 degrees≤α(PL)≤45 degrees, wherein said taper angle α(BM) is defined as an angle formed between two lines, one of which is a line parallel to said transparent substrate and the other is a straight line between a contact point of said frame pattern with said transparent substrate at an outer edge thereof and a point on a slope of said frame pattern located at 90% of a film thickness thereof, while said taper angle α (PL) is defined as an angle formed between two lines, one of which is a line parallel to said transparent substrate and the other is a straight line between a contact point of said planarization pattern layer with said transparent substrate at an outer edge thereof and a point on a slope of said planarization pattern layer located at 90% of a film thickness thereof.

8. The color filter substrate according to claim 1, further comprising a marker formed by said black matrix pattern, and said planarization pattern layer is formed so as not to cover said marker.

9. The color filter substrate according to claim 1, wherein said planarization pattern film is formed only on a limited region of said frame pattern of said black matrix pattern satisfying following inequity:

0 degrees≤β≤45 degrees, wherein said β is an angle formed between a rubbing direction and a direction crossing at right angle around said frame pattern of said black matrix pattern.

* * * * *